(12) United States Patent
Malizia, Jr.

(10) Patent No.: US 7,058,461 B2
(45) Date of Patent: Jun. 6, 2006

(54) PAGE BACK SYSTEM AND METHOD FOR REMOTE PAGING IN A CONTROL SYSTEM

(75) Inventor: Samuel John Malizia, Jr., Struthers, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/790,520

(22) Filed: Mar. 1, 2004

(65) Prior Publication Data

US 2004/0166842 A1  Aug. 26, 2004

Related U.S. Application Data

(63) Continuation of application No. 09/616,254, filed on Jul. 14, 2000, now Pat. No. 6,745,090.

(51) Int. Cl.
  *G05B 19/18* (2006.01)

(52) U.S. Cl. .............. 700/66; 700/9; 700/18; 700/23; 700/65; 700/86; 700/87; 709/205; 709/208; 709/217; 709/220; 712/28; 712/29; 718/100; 718/108; 701/2; 701/213; 701/300

(58) Field of Classification Search ............ 700/9, 700/17–23, 56, 65–66, 83–88; 345/418–421; 709/208, 217, 220, 205; 712/28–29; 718/100, 718/108; 701/2, 213–214, 300, 302
See application file for complete search history.

(56) References Cited

U.S. PATENT DOCUMENTS

| | | | | |
|---|---|---|---|---|
| 4,410,983 A | * | 10/1983 | Cope | .................. 710/100 |
| 4,949,299 A | * | 8/1990 | Pickett | .................. 710/105 |
| 5,446,868 A | * | 8/1995 | Gardea et al. | .................. 703/27 |
| 5,768,632 A | * | 6/1998 | Husted et al. | .................. 710/72 |
| 5,842,039 A | * | 11/1998 | Hanaway et al. | .................. 710/11 |
| 6,061,603 A | * | 5/2000 | Papadopoulos et al. | .................. 700/83 |
| 6,118,856 A | * | 9/2000 | Paarsmarkt et al. | .................. 379/93.24 |
| 6,476,858 B1 | * | 11/2002 | Ramirez Diaz et al. | .................. 348/159 |
| 6,745,090 B1 | * | 6/2004 | Malizia, Jr. | .................. 700/65 |
| 2002/0041238 A1 | * | 4/2002 | Johnson et al. | .................. 340/870.28 |
| 2002/0198990 A1 | * | 12/2002 | Bradfield et al. | .................. 709/224 |
| 2003/0085998 A1 | * | 5/2003 | Ramirez-Diaz et al. | .................. 348/143 |

* cited by examiner

Primary Examiner—Ramesh Patel
(74) Attorney, Agent, or Firm—Amin & Turocy LLP; R. Scott Speroff

(57) ABSTRACT

The invention comprises a modem apparatus adapted to provide full messaging and communications interface between a control device and a communications medium such as a telephone line. The modem can comprise an interface adapted to communicate directly with a control system device, such as a programmable logic controller (PLC), using a communications protocol compatible with the normal network communications used in a distributed control system. The apparatus advantageously interfaces directly with unmodified control system devices, providing the ability to send and receive messages from remote devices or personnel via a communications medium. The invention also comprises a control system including a modem device providing full communications between a control device and remote personnel and/or devices. The apparatus can further be operative to monitor certain control conditions via communications with the control device, and to create and transmit messages across a communications medium according to the monitored control conditions.

17 Claims, 15 Drawing Sheets

PAGE BACK SYSTEM AND METHOD FOR REMOTE PAGING IN A CONTROL SYSTEM

CROSS-REFERENCE TO RELATED APPLICATIONS

This application is a continuation application of U.S. patent application Ser. No. 09/616,254, filed Jul. 14, 2000, now U.S. Pat. No. 6,745,090, entitled PAGE BACK SYSTEM AND METHOD FOR REMOTE PAGING IN A CONTROL SYSTEM.

TECHNICAL FIELD

The present invention relates to the art of industrial controllers, and more particularly to a method and apparatus for remote paging in a distributed control system.

BACKGROUND OF THE INVENTION

Industrial controllers are special purpose computers used for controlling industrial processes, manufacturing equipment, and other factory automation applications. In accordance with a control program, an industrial controller may measure one or more process variables or inputs reflecting the status of a controlled process, and change outputs effecting control of the process. The inputs and outputs may be binary, (e.g., on or off), as well as analog inputs and outputs assuming a continuous range of values. The control program may be executed in a series of execution cycles with batch processing capabilities.

The measured inputs received from a controlled process and the outputs transmitted to the process generally pass through one or more input/output (I/O) modules. These I/O modules serve as an electrical interface between the controller and the controlled process, and may be located proximate or remote from the controller. The inputs and outputs are recorded in an I/O table in processor memory. Input values may be asynchronously read from the controlled process by one or more input modules and output values are written directly to the I/O table by the processor for subsequent communication to the process by specialized communications circuitry. An output module may interface directly with a controlled process, by providing an output from an I/O table to an actuator such as a motor, valve, solenoid, and the like.

During execution of the control program, values of the inputs and outputs exchanged with the controlled process pass through the I/O table. The values of inputs in the I/O table are asynchronously updated from the controlled process by dedicated scanning circuitry. This scanning circuitry may communicate with input and/or output modules over a bus on a backplane or network communications. The scanning circuitry also asynchronously writes values of the outputs in the I/O table to the controlled process. The output values from the I/O table are then communicated to one or more output modules for interfacing with the process. Thus, the processor may simply access the I/O table rather than needing to communicate directly with the controlled process.

An industrial controller may be customized to a particular process by writing control software that may be stored in the controller's memory and/or by changing the hardware configuration of the controller to match the control task. In distributed control systems, controller hardware configuration is facilitated by separating the industrial controller into a number of control modules, each of which performs a different function. Particular control modules needed for the control task may then be connected together on a common backplane within a rack and/or through a network or other communications medium. The control modules may include processors, power supplies, network communication modules, and I/O modules exchanging input and output signals directly with the controlled process. Data may be exchanged between modules using a backplane communications bus, which may be serial or parallel, or via a network. In addition to performing I/O operations based solely on network communications, smart modules exist which may execute autonomous logical or other programs.

Various control modules of a distributed industrial control system may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

In a typical distributed control system, one or more I/O modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values may be used by a processor (e.g., a PLC) for performing control computations.

Conventional control devices typically provide a run mode wherein a module executes a control program and a configure mode wherein the control program execution is suspended. As control systems become more widely distributed, the logic or control program associated with a particular process or system may be executed on a large number of modules or devices. In this way, individual processors in the devices execute a program autonomously from the rest of the system components. Smart devices, such as I/O modules, transducers, sensors, valves, and the like may thus be programmed to execute certain logical or other programs or operations independently from other such devices.

In distributed control systems, it may be desirable to notify remote systems or personnel of certain process conditions. Telephone lines and modems may be used to provide communications between controllers in a distributed control system and other devices. In addition, modems and pagers may be used to generate and transmit messages across telephone lines. Conventional modems communicate across telephone lines via standard protocols, such as the Telocator Alphanumeric Paging Protocol (TAP). The modem may communicate with a host device, such as a personal computer, via a standard communications or COMM port using standard communications protocols. The universal applicability of conventional modems is achieved in part through the use of standard communications with personal computers and the like. However, the messaging capabilities of these standard communications protocols is limited with respect to communicating with industrial control devices.

Industrial control devices typically are provided with communications interfaces allowing communication with other devices across a bus or network. Proprietary or specialized communications protocols and messaging are used in such control system communications architectures. Previously, industrial control devices had to be customized in order to communicate with conventional modem devices using standard communications protocols. This increased the cost of the control device, and sacrificed many advantageous messaging capabilities not supported by the standard protocol of prior modems or pagers. Consequently, the application of conventional modems and pagers to industrial control system devices has heretofore failed to adequately provide full communications messaging capabilities between distributed control system devices and remote devices and/or personnel at minimal cost, and without modification of the control system devices.

SUMMARY OF THE INVENTION

In accordance with the present invention, there is provided a modem apparatus adapted to provide full messaging and communications interface between a control device and a remote device via a telephone line or other communications medium. The modem includes an interface adapted to communicate directly with a control system device, such as a programmable logic controller (PLC), using a communications protocol compatible with the normal network or backplane communications used in a distributed control system. This apparatus advantageously interfaces directly with unmodified control system devices, providing the ability to send and receive messages from remote devices or personnel via telephone lines or other suitable communications mediums (e.g., Internet, wireless). The employment in the modem of a communications protocol adapted for communications with a control device allows full messaging capabilities between the control device and remote personnel and/or devices.

The apparatus may further be operative to monitor certain control conditions via communications with the control device, and to create and transmit one or more pager messages across telephone lines according to the monitored control conditions. In addition, the apparatus may provide data values in the pager messages to apprise the recipient of process related information relevant to the control condition which initiated the pager message transmission. In addition to the communications protocol compatible with the normal network communications used in a distributed control system, the apparatus may also support standard communications protocols used in conventional modems or pagers. In this regard, a switch or other selection mechanism may be included for user selection of the desired communication protocol. Thus, the modem apparatus may communicate directly with a personal computer or other standard device, whereby the apparatus may be conveniently configured by a user.

In accordance with one aspect of the present invention, there is provided a communications apparatus for communicating with an industrial control device and a remote device via a communications medium. The apparatus includes a first communications interface operative to communicate with the industrial control device using a first communications protocol, a second communications interface operative to communicate with the remote device via the communications medium using a second communications protocol, and a processor in electrical communication with the first and second communications interfaces and operative to exchange messages with the industrial control device and the communications medium via the first and second communications interfaces.

The processor may receive trigger information from the industrial control device via the first communications interface, and selectively construct and transmit one or more pager messages via the second communications interface according to the trigger information.

The communications apparatus may advantageously be programmed or adapted to page remote devices and/or personnel, for example, when a process variable associated with a controlled process exceeds a certain value. According to another aspect of the invention, the first communications protocol may be the Allen-Bradley DF1 protocol and the second communications protocol may be the Telocator Alphanumeric Paging Protocol (TAP). The apparatus thus provides a pager interface with full messaging capabilities for interacting with standard control devices, for example, Allen-Bradley PLC, SLC, Contrologix, and Micrologix processors.

In accordance with another aspect of the present invention, the communications apparatus may further comprise a switch in electrical communication with the processor. The switch may be used to select a communications protocol for the first communications interface. This allows the device to selectively communicate with a control device using one communications protocol (e.g., Allen-Bradley DF1 protocol), or with a programming device (e.g., a personal computer) using another protocol (e.g., ASCII). A user may accordingly program the communications apparatus using a computer, then change the switch position and connect the apparatus to a control device. This aspect of the invention allows the use of the pager or modem communications apparatus with devices supporting disparate communications protocols (e.g., a personal computer and a control device), without the need to modify or customize one of the devices.

According to another aspect of the invention, the communications apparatus may be further adapted to receive programming messages from the communications medium via the second communications interface. This allows the apparatus to be programmed via a programming message from a programming device connected to the communications medium. Thus, the communication device's program may be changed by remote devices or personnel without interrupting the connection between the apparatus and a control device. This is useful, for example, where a process condition has been reported via the communications apparatus (e.g. by transmitting a pager message), such as a high temperature condition, and a remote user wishes to change the value at which the apparatus will provide subsequent pager messages, or to disable future pages altogether.

According to yet another aspect of the invention, the apparatus may be adapted to receive a programming message from the communications medium via the second communications interface and to transmit the programming message to the industrial control device via the first communications interface. This feature allows a remote user to program the control device from a telephone connection.

According to still another aspect of the invention, the communications apparatus may receive a first message from a first device connected to the communications medium via the second communications interface and transmit or forward the first message to the industrial control device via the first communications interface. In addition, the apparatus may receive a second message from the industrial control device via the first communications interface and transmit or forward the second message to the first device connected to the communications medium via the second communications interface. The apparatus may thus operate as a telephone interface between a remote user and the control device. This is useful, for example, where a remote user or device has received a pager message indicating a particular process variable or condition, and wishes to further interrogate and/or reprogram the control device.

In accordance with another aspect of the invention, an industrial control system is provided for controlling a process. The system comprises a modem or pager communications device having a first communications interface operative to communicate using a first communications protocol, and a second communications interface operative to communicate using a second communications protocol. The first communications protocol may be, for example, the Allen-Bradley DF1 protocol and the second communications protocol may be the Telocator Alphanumeric Paging Protocol (TAP).

The system further includes a control device having a third communications interface adapted for removable connection with the first communications interface and operative to communicate with the modem device using the first communications protocol (e.g., the Allen-Bradley DF1 protocol), and an output operative to interface with a controlled process. A communications medium maybe operatively connected to the second communications interface to communicate with the modem device using the second communications protocol (e.g., TAP). The control device may be adapted to send trigger information to the modem device, and the modem device is adapted to selectively construct and transmit a pager message via the second communications interface according to the trigger information.

According to yet another aspect of the invention a method is provided for sending a message from a control device to a remote device via a communications medium. The method includes obtaining trigger information via a first communications interface from the control device and determining if a trigger condition exists according to the trigger information. If a trigger condition exists, the trigger condition is correlated with a data variable, which is obtained from the control device via the first communications interface. The method further includes creating a pager message including a text string and the data variable, and transmitting the pager message to a remote device via a second communications interface and the communications medium using a second communications protocol.

To the accomplishment of the foregoing and related ends, the invention, then, comprises the features hereinafter fully described. The following description and the annexed drawings set forth in detail certain illustrative applications and aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
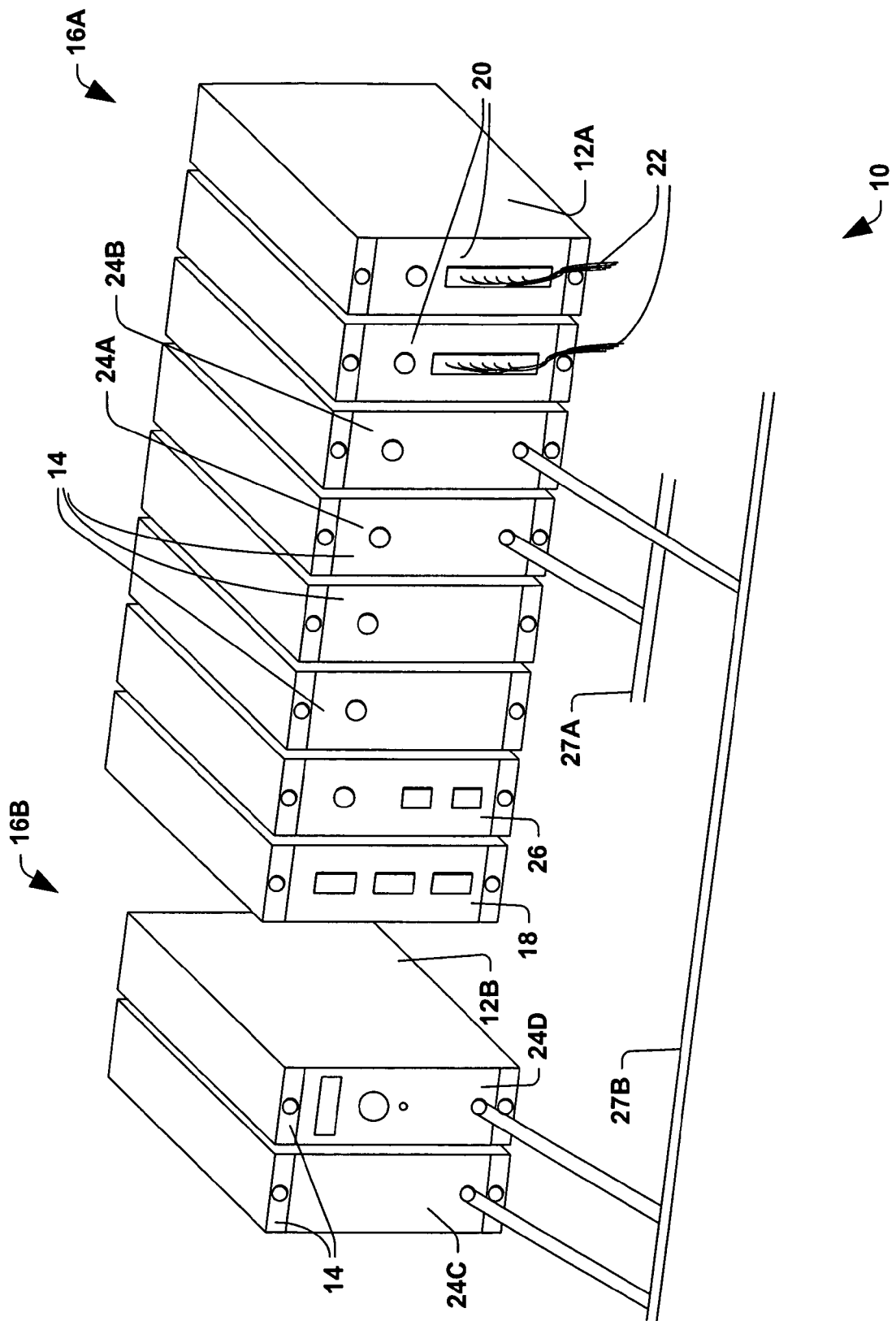
FIG. 1 is a perspective view illustrating a distributed industrial control system having multiple functional modules contained in several racks joined by communication links.

The various aspects of the present invention will now be described with reference to the drawings, wherein like reference numerals are used to refer to like elements throughout. The invention provides a system and method for creating and sending a pager message from a communications device to a remote device via a communications medium, according to a control condition in a control device which triggers the pager message construction and transmission. The communications device communicates with the control device using a communications protocol, for example, the Allen-Bradley DF1 protocol, to allow use with standard control devices.

Referring to FIG. 1, a distributed industrial control system 10 suitable for use with the present invention provides a first and second rack 12A and 12B for holding a number of functional modules 14 electrically interconnected by backplanes 16A and 16B running along the rear of the racks 12A and 12B respectively. Each module 14 may be individually removed from the rack 12A or 12B thereby disconnecting it from its respective backplane 16 as will be described below for repair or replacement and to allow custom configuration of the distributed system 10.

The modules 14 within the rack 12A may include, for example, a power supply module 18, a processor module 26, two communication modules 24A and 24B and two I/O modules 20. A power supply module 18 receives an external source of power (not shown) and provides regulated voltages to the other modules 14 by means of conductors on the backplane 16A.

The I/O modules 20 provide an interface between inputs from, and outputs to external equipment (not shown) via cabling 22 attached to the I/O modules 20 at terminals on their front panels. The I/O modules 20 convert input signals on the cables 22 into digital words for transmission on the backplane 16A. The I/O modules 20 also convert other digital words from the backplane 16A to the necessary signal levels for control of equipment.

The communication modules 24A and 24B provide a similar interface between the backplane 16A and one of two external high speed communication networks 27A and 27B. The high speed communication networks 27A and 27B may connect with other modules 14 or with remote racks of I/O modules 20 or the like. In the example illustrated in FIG. 1, the high speed communication network 27A connects with backplane 16A via the communication module 24A, whereas the high speed communication network 27B connects the communication module 24B with communication modules 24C and 24D in rack 12B. The processor module 26 processes information provided by the communication modules 24A and 24B and the I/O modules 20 according to a stored program and provides output information to the communication module 24 and the I/O modules 20 in response to that stored program and received input messages.

Figure 2:
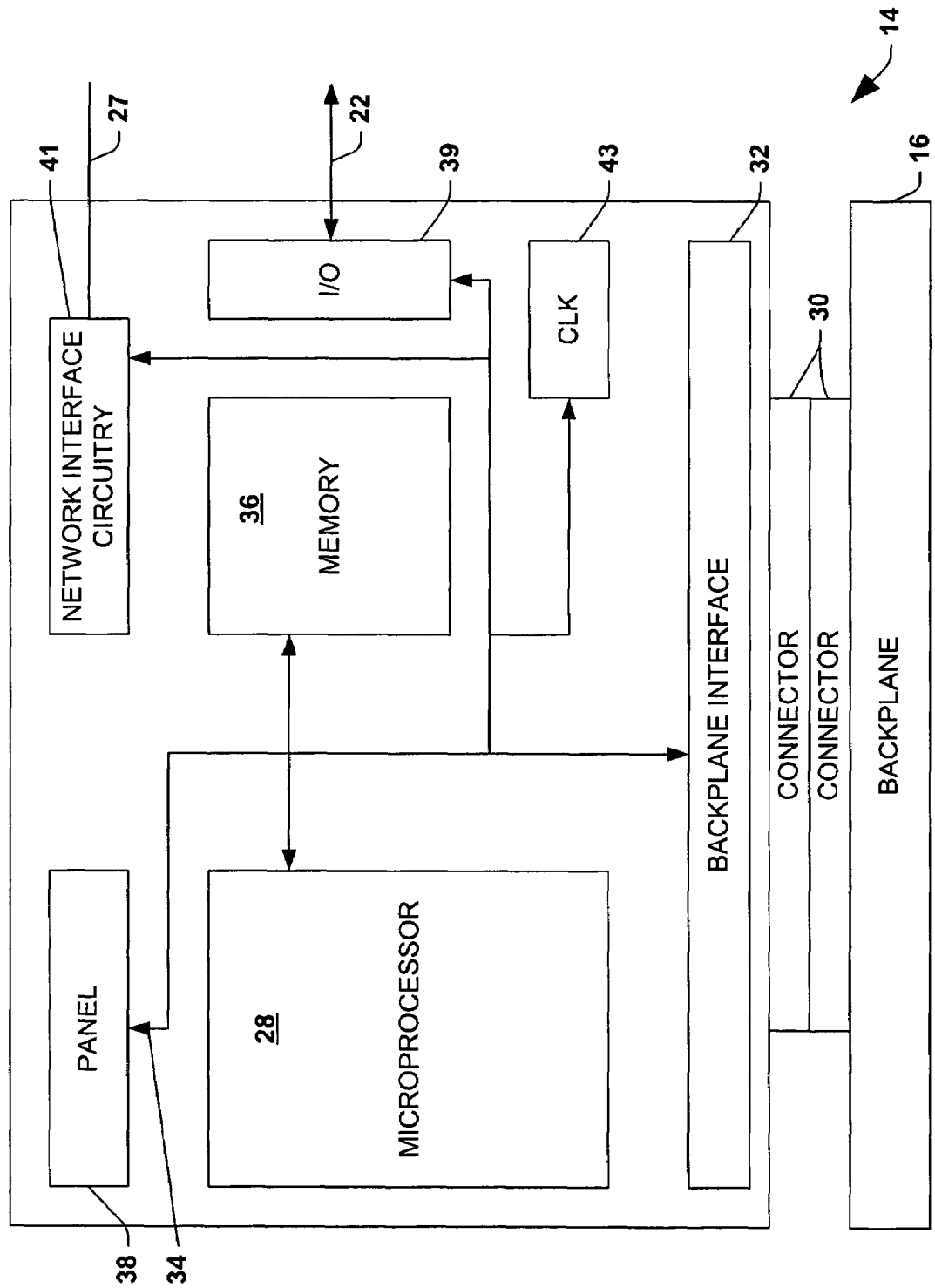
FIG. 2 is a schematic block diagram of a single functional module of FIG. 1 illustrating its connection to a common backplane and communication links to communicate with other modules.

Referring also to FIG. 2, the functional modules 14 are attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14.

Local communication with the other modules 14 through the backplane 16 is accomplished by means of a backplane interface 32 which electrically connects the backplane 16 through connector 30. The backplane interface 32 monitors messages on the backplane 16 to identify those messages intended for the particular module 14, based on a message address being part of the message and indicating the message's destination. Messages received by the backplane interface 32 are conveyed to an internal bus 34 in the module 14.

The internal bus 34 joins the backplane interface 32 with a memory 36, a microprocessor 28, front panel circuitry 38, I/O interface circuitry 39 (if the module is an I/O module 20) and communication network interface circuitry 41 (if the module is a communication module 24). The microprocessor 28 may be a general purpose microprocessor providing for the sequential execution of instructions contained in memory 36 and the reading and writing of data to and from the memory 36 and the other devices associated with the internal bus 34.

The microprocessor 28 includes an internal clock circuit (not shown) providing the timing of the microprocessor 28 but may also communicate with an external precision clock 43 of improved precision. This clock 43 may be a crystal controlled oscillator or other time standard including a radio link to an NBS time standard. The precision of the clock 43 is recorded in the memory 36 as a quality factor. The panel circuitry 38 includes status indication lights such as are well known in the art and manually operable switches such as for locking the module 14 in the off state.

The memory 36 holds programs executed by the microprocessor 28 to provide the functions as will be described and also variables and data necessary for the execution of those programs. For I/O modules 20, the memory 36 also includes an I/O table holding the current state of inputs and outputs received from and transmitted to the industrial controller 10 via the I/O modules 20.

Figure 3A:
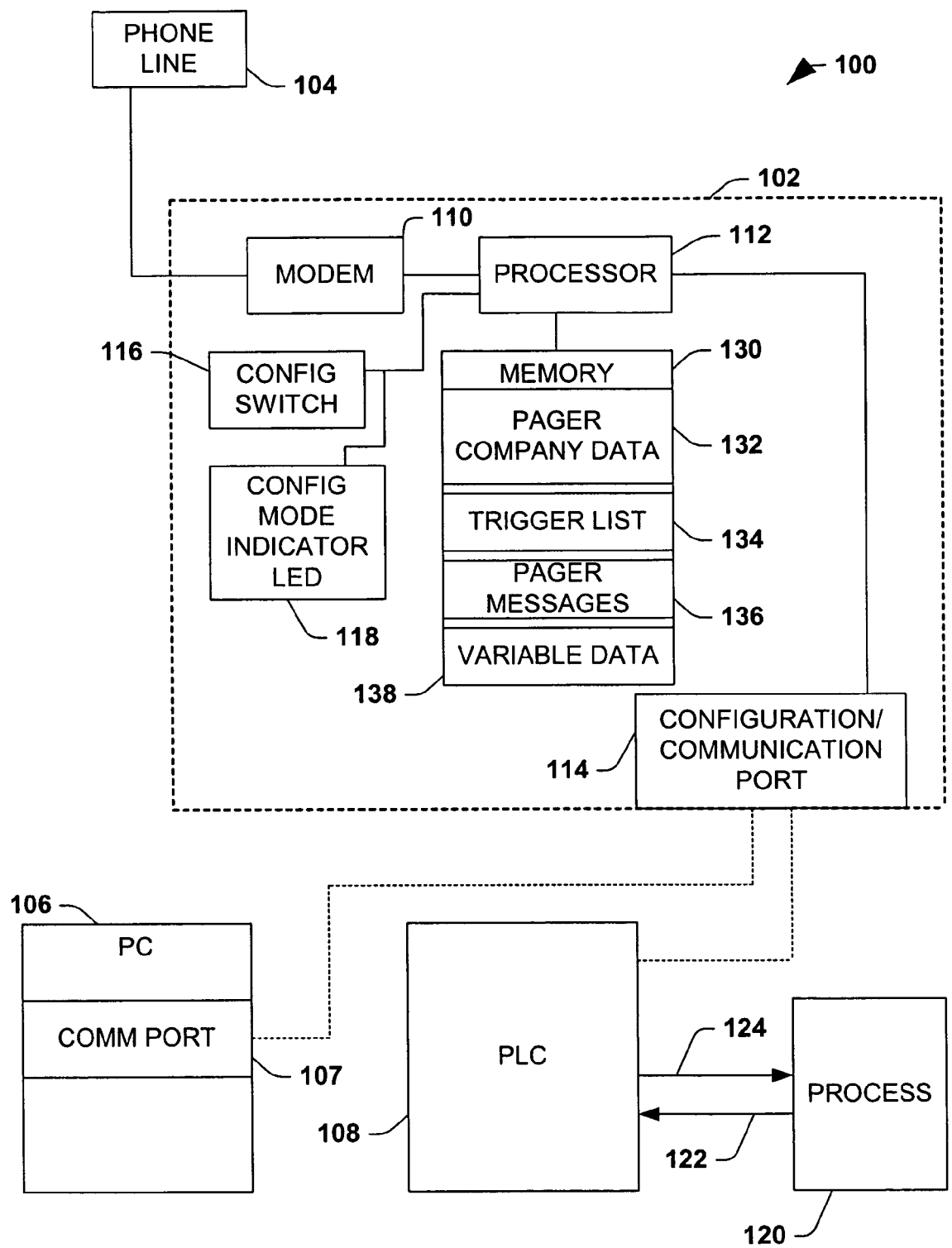
FIG. 3A is a schematic block diagram illustrating an exemplary control system having a communications apparatus in accordance with an aspect of the present invention.

Referring now to FIG. 3A, an exemplary distributed control system 100 is illustrated in which various aspects of the present invention may be implemented. The system includes a communications device or apparatus 102 operatively connected between a telephone line 104 and one of a personal computer (PC) 106 and a control device (PLC) 108 for communication therewith. The communications device 102 includes a modem 110 providing a communications interface between a processor 112 and a remote device (not shown) via the telephone line 104. The modem 110 may communicate via the telephone line 104 using a standard pager protocol, for example the Telocator Alphanumeric Paging Protocol (TAP). While the exemplary communications device 102 is illustrated as communicating via the telephone line 104, the invention finds application in association with other communications mediums, for example, wireless and the Internet.

The processor 112 also connects to a configuration/communication port 114, which provides a communications interface with one of the PC 106 and the PLC 108, as described in greater detail infra. The port 114 may be, for example, an RS-232 or RS-485 compatible serial port. A configuration switch 116 and a configuration mode indicator LED 118 are operatively connected to the processor 112 to allow a user to select one of two communications protocols (not shown) used in communicating via port 114. For example, a control device protocol (e.g., Allen-Bradley DF1 protocol) may be used for communicating with the PLC 108 when the switch 116 is in one switch state, and another protocol (e.g., ASCII) may be used in communicating with the PC 106 when the switch 116 is in another switch state. The LED 118 provides a user with an indication of which state the switch 116 is in.

The provision of the switch 116 and the support for a plurality of communications protocols allows a user to configure or otherwise communicate with the device 102 by connecting a COMM port 107 of the PC 106 to the port 114 of device 102, and sending programming or other messages (e.g., using ASCII programming instructions) to the device 102 in a configuration mode with the switch 116 in one state. Thereafter, the user may change the switch state, and connect the port 114 to the PLC control device 108 for paging operation (e.g., using DF1 protocol), as described in greater detail infra. The PLC control device 108 may be operatively connected to interface with a process 120 by reading one or more inputs 122 (e.g., process variables) and/or providing one or more outputs 124 (e.g., control signals).

Figure 3B:
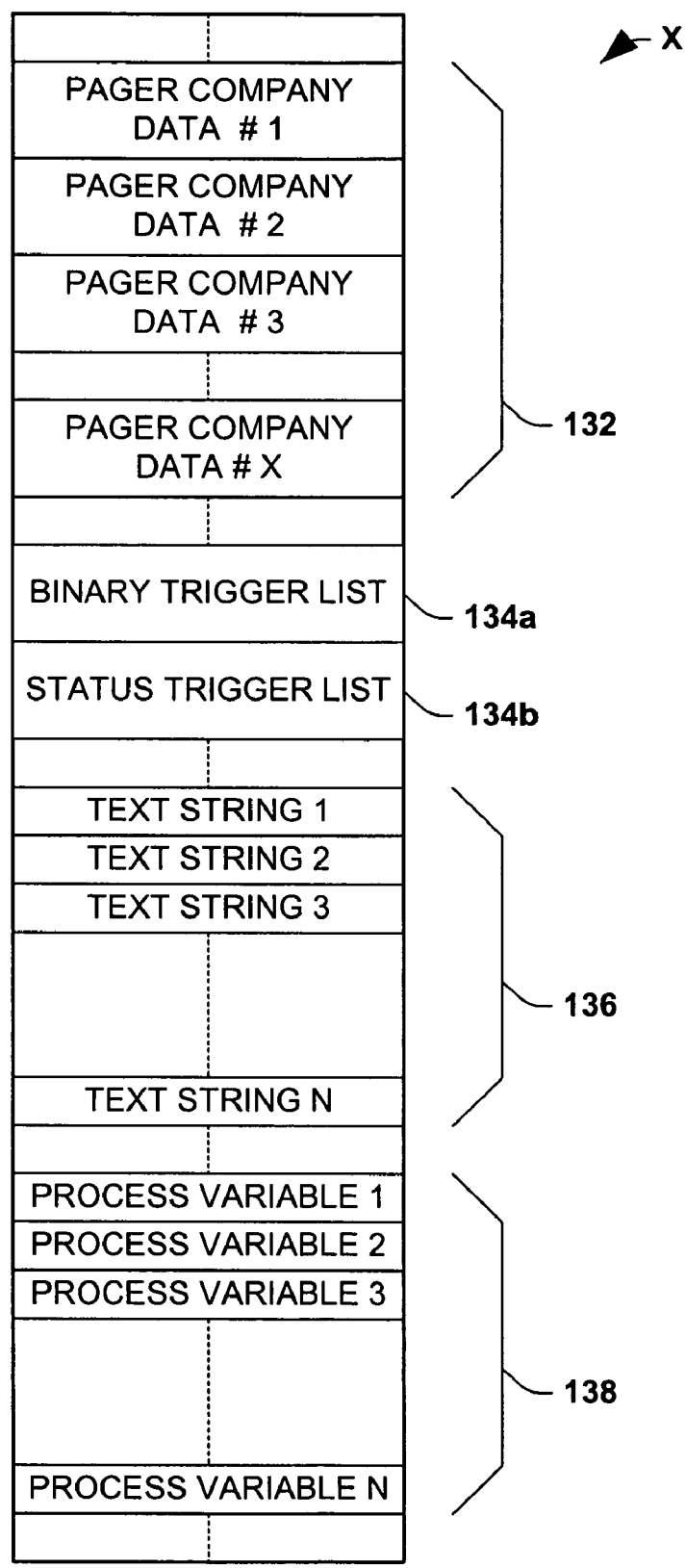
FIG. 3B is a schematic block diagram illustrating an exemplary memory organization according to an aspect of the invention.

Referring also to FIG. 3B, the device 102 further includes a memory 130 having stored therein pager company data 132, a trigger list 134, a pager message list 136, and variable data 138. It will be appreciated that the memory 130 may further include program instructions (not shown), which may be executed by the processor 112 to implement the various functions associated with operation of the device 102. The pager company data 132 may comprise one or more entries in the memory 130 (e.g., PAGER COMPANY DATA # 1, PAGER COMPANY DATA # 2, . . . , PAGER COMPANY DATA # X, where X is an integer), whereby pager messages may be sent via one or more pager service provider companies. The device 102 may accordingly be programmed to attempt to send a pager message via a first pager company, and if unsuccessful, to make subsequent attempts using a different pager company. The pager company data may include, for example, telephone access numbers, PIN numbers, and the like, to enable proper connection and transmission of pager messages via the pager company service providers.

The trigger list 134 may comprise one or more individual trigger lists, such as a binary trigger list 134a and a status trigger list 134b. This allows pager message construction and transmission by the device 102 to be triggered by binary information and/or status information received from the PLC control device 108. Transmitted pager messages (as illustrated and described in greater detail with respect to FIG. 4G infra) may include a text string field obtained from the pager message list 136, and a process variable or value obtained from the control device 108 according to the variable data list 138. In this regard, a user may define N pager messages and N process variables, where N is an integer, which may be selectively transmitted by the communications device 102 to a remote device (not shown) via the modem interface 110 and the telephone line 104.

Figure 3C:
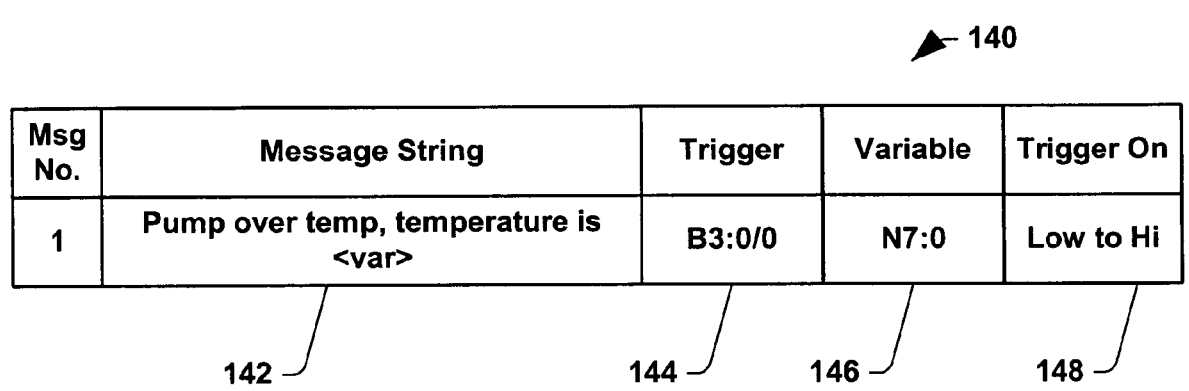
FIG. 3C is a schematic illustration of an exemplary message string definition in accordance with an aspect of the invention.

Referring also to FIG. 3C, an exemplary message string definition 140 is illustrated. A user may define pager messages via PC 106 or another programming device connected to the port 114. The defined information may be stored by the processor 112 in one or more tables or lists of the memory 130. The pager message definition includes the provision of a message or text string 142, for example, "Pump over temp, temperature is <var>" as illustrated in FIG. 3C. Also included in the definition 140, are a trigger address 144 (e.g., B3:0/0), a data variable address 146 (e.g., N7:0), and a trigger on definition (e.g., a low to high transition).

In the example of FIG. 140, the device 102 may periodically interrogate the control device 108 by sensing a low to high transition on the binary data (e.g., bit) at address B3:0/0 of the device 108. If such a transition is sensed, the communications device 102 obtains the data variable at control device address N7:0, and constructs a pager message including the text string and the data variable. The recipient of the pager message will then be provided with useful information comprising a textual indication of the type of control condition which initiated the message, as well as a value indication related thereto. For example, the message may indicate "Pump over temp, temperature is 135". It will be appreciated that pager messages can be sent including no process variable, and that the user may accordingly program the communications device 102 using a definition (e.g., definition 140) to selectively include such variable information, for example, by leaving the variable field 146 empty.

Figure 4A:
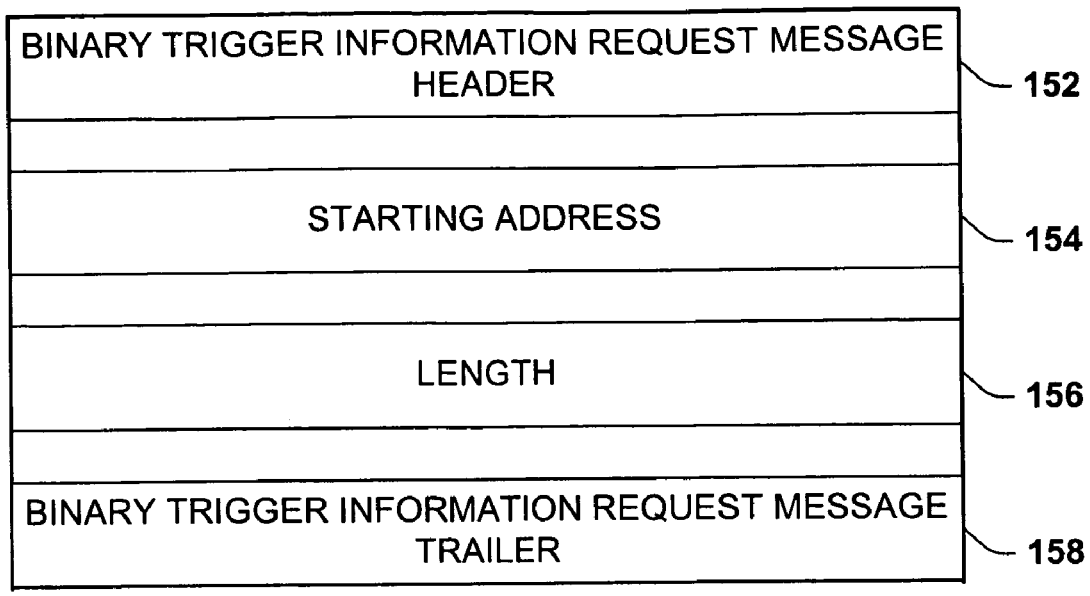
FIG. 4A is a schematic illustration of an exemplary trigger information request message from a communications apparatus to a control device according to an aspect of the invention.

Referring now to FIGS. 4A–4G, several exemplary information request and response messages are illustrated, along with an exemplary pager message. It will be recognized that the system and apparatus of the present invention may employ message types and formats other than those illustrated and described herein. FIG. 4A illustrates an exemplary trigger information request message 150 from a communications apparatus (e.g., device 102) to a control device (e.g., PLC 108) according to an aspect of the invention. The request message 150 may be used by the device 102 to request binary trigger information (e.g., one or more binary values defined as trigger points in the definition 140) and includes a header field 152, a starting address field 154, a length field 156, and a trailer field 158.

Figure 4B:
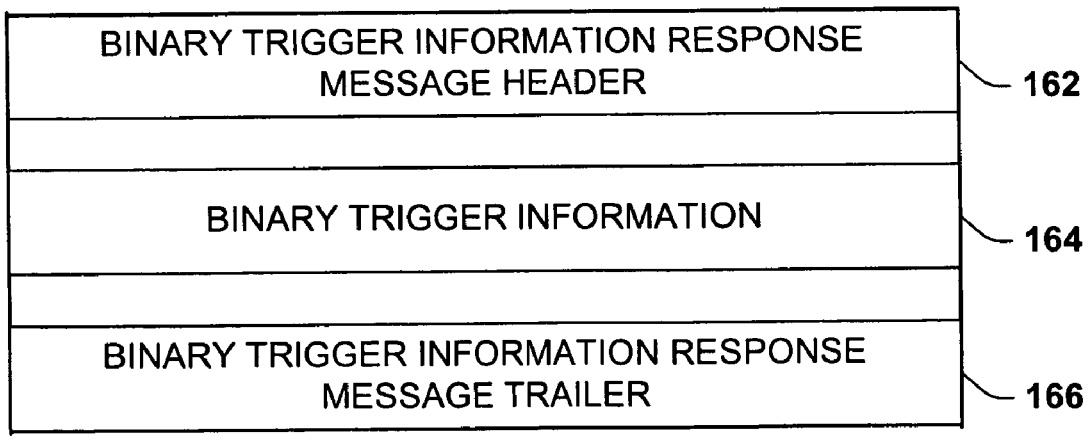
FIG. 4B is a schematic illustration of an exemplary trigger information response message from a control device to a communications apparatus according to another aspect of the invention.

Referring also to FIG. 4B, the PLC control device 108 in turn provides a response message 160 to the communications device 102, which includes a header field 162, the requested binary trigger information 164, and a trailer field 166. It will be appreciated that the header and trailer fields in the illustrated exemplary messages may be advantageously employed to provide for proper message routing, for example, including source and destination addresses, checksum values, and the like. The communications device 102 may evaluate the binary trigger information 164 received from the control device 108 in order to determine whether a trigger condition exists, as described in greater detail infra.

Figure 4C:
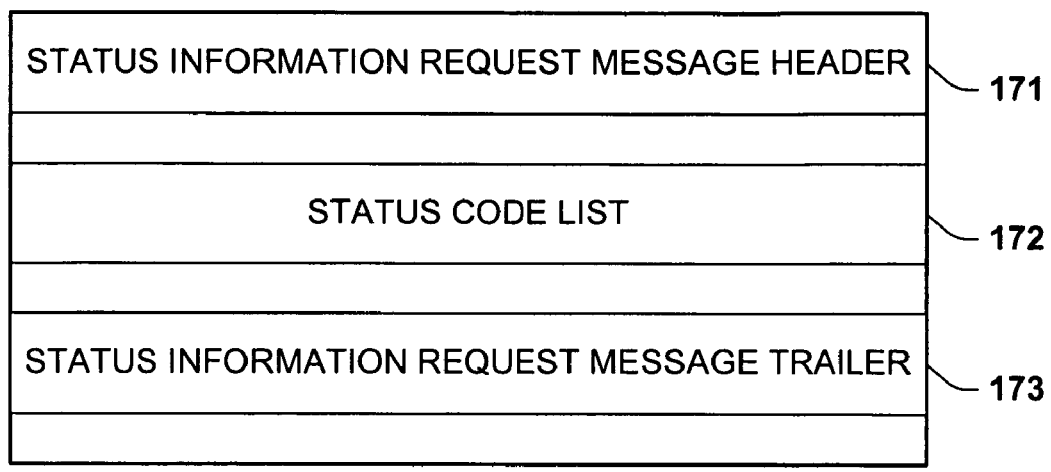
FIG. 4C is a schematic illustration of an exemplary status information request message from a communications apparatus to a control device according to an aspect of the invention.
Figure 4D:
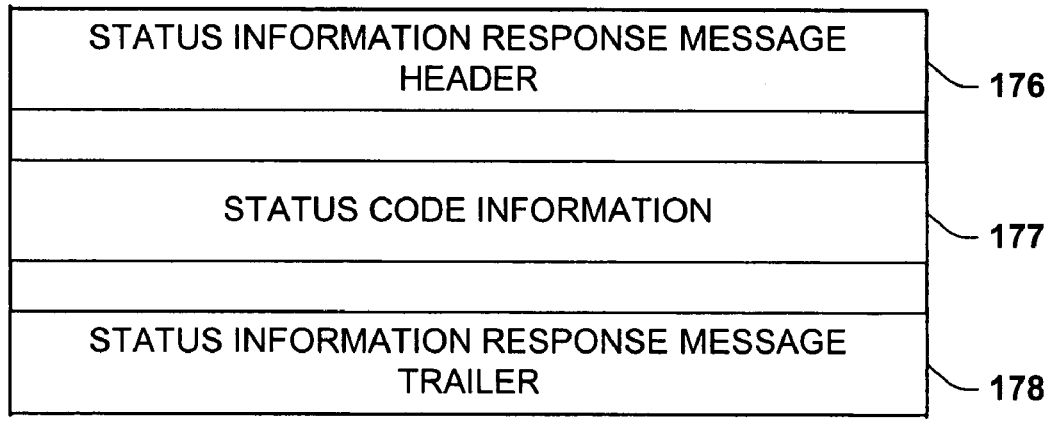
FIG. 4D is a schematic illustration of an exemplary status information response message from a control device to a communications apparatus according to another aspect of the invention.

Referring also to FIGS. 4C and 4D, an exemplary status information request message 170 is illustrated from a communications apparatus (e.g., device 102) to a control device (e.g., PLC 108). Like the binary trigger information request message 150 of FIG. 4A, the status information request message 170 may be used by the device 102 to request trigger information (e.g., one or more status indications or conditions defined as trigger points in a pager message definition). Message 170 includes a header field 171, a status code list 172, and a trailer field 173. In FIG. 4D, the PLC control device 108 responds with a status information response message 175 to the communications device 102, which includes a header field 176, the requested status code information 177, and a trailer field 178. The communications device 102 may evaluate the status code information 177 received from the control device 108 in order to determine whether a trigger condition exists.

Figure 4E:
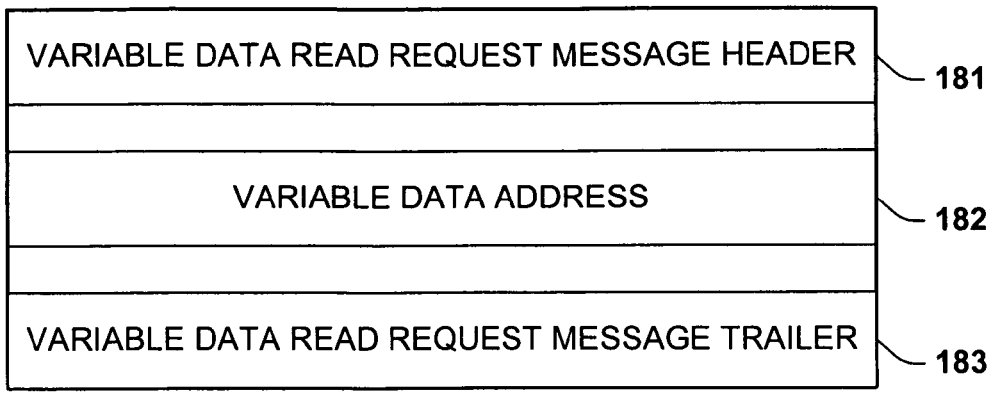
FIG. 4E is a schematic illustration of an exemplary variable data request message from a communications apparatus to a control device according to an aspect of the invention.
Figure 4F:
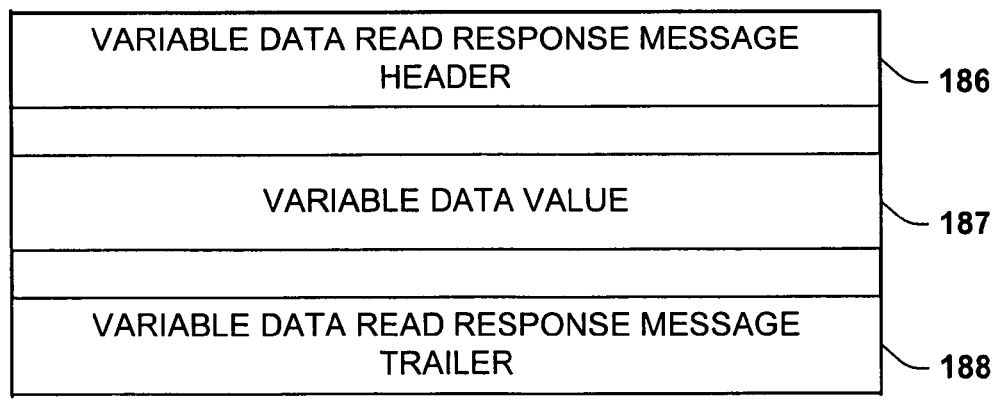
FIG. 4F is a schematic illustration of an exemplary variable data response message from a control device to a communications apparatus according to another aspect of the invention.

Referring now to FIGS. 4E and 4F, if device 102 determines (e.g., from the requested binary and/or status information) that a trigger condition exists, the trigger condition will be correlated with the pager message definitions programmed by the user. The correlation will indicate whether a data variable is needed for inclusion in the pager message. If so, a variable data read message 180 may be sent from the communications device 102 to the control device 108. The message 180 includes a header field 181, the address of the appropriate variable data 182 (e.g., variable address 146 of definition 140 in FIG. 3C), and a trailer field 183. In reply, the control device 108 sends a variable data response message 185, as illustrated in FIG. 4F. Message 185 includes a header field 186, the requested variable data value 187, and a trailer field 188.

Figure 4G:
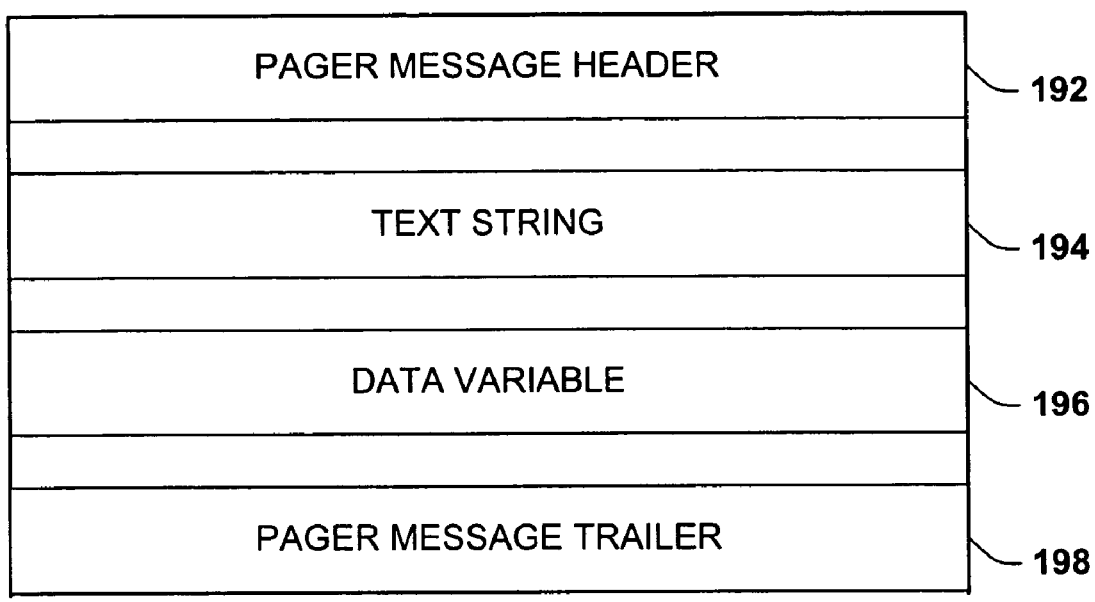
FIG. 4G is a schematic illustration of an exemplary pager message from a communications apparatus according to an aspect of the invention.

Referring now to FIG. 4G, once the desired data value 187 has been received in the response message 185, communications device 102 creates a pager message 190 for transmission to a remote device via the modem 110 and the telephone line 104. The message 190 includes a header field 192, a text string 194, a data variable 196, and a trailer field 198. The header field may include information obtained from the pager company data 132 of memory 130 of FIG. 3B. The text string may be a user-defined string obtained from the text string list 136, and the data variable may be the value 187 obtained in the variable data response message 185 of FIG. 4F.

It will be appreciated that further messages are contemplated as within the scope of the present invention. In particular, the communications device 102 may be programmed through programming messages (not shown) from the PC 106 via port 114, or alternatively through programming messages from a remote device (not shown) via the telephone line 104. Moreover, the control device may be programmed using the telephone line 104, the device 102, and the port 114. This enables a pager message recipient to effectuate a telephone link with the communications device 102 remotely using telephone line 104, and to then communicate with the control device 108 via data request messages and/or programming messages.

Figure 5A:
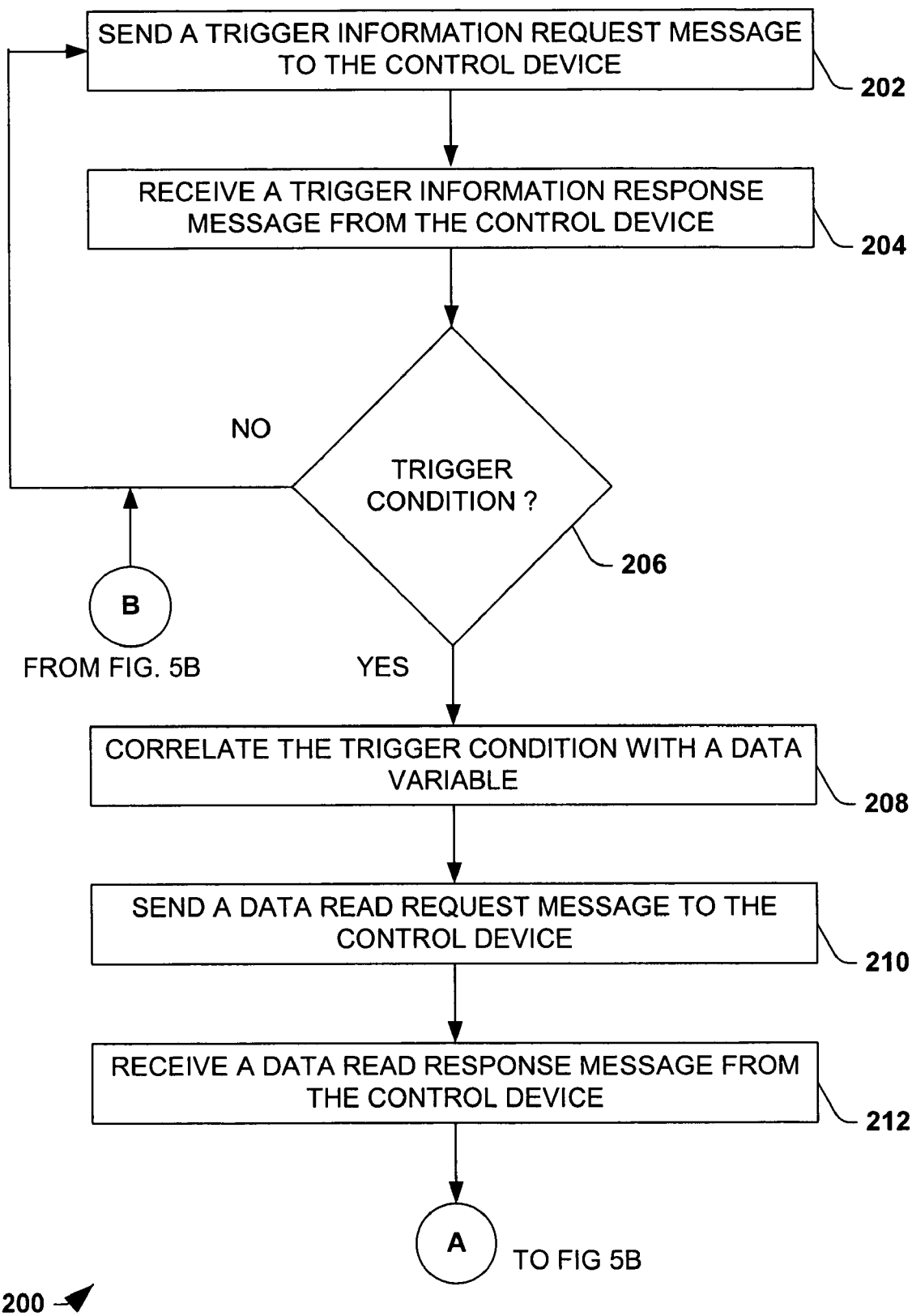
FIG. 5A is a flow diagram illustrating an exemplary method for sending a message from a control device to a remote device via a communications medium in accordance with another aspect of the invention.
Figure 5B:
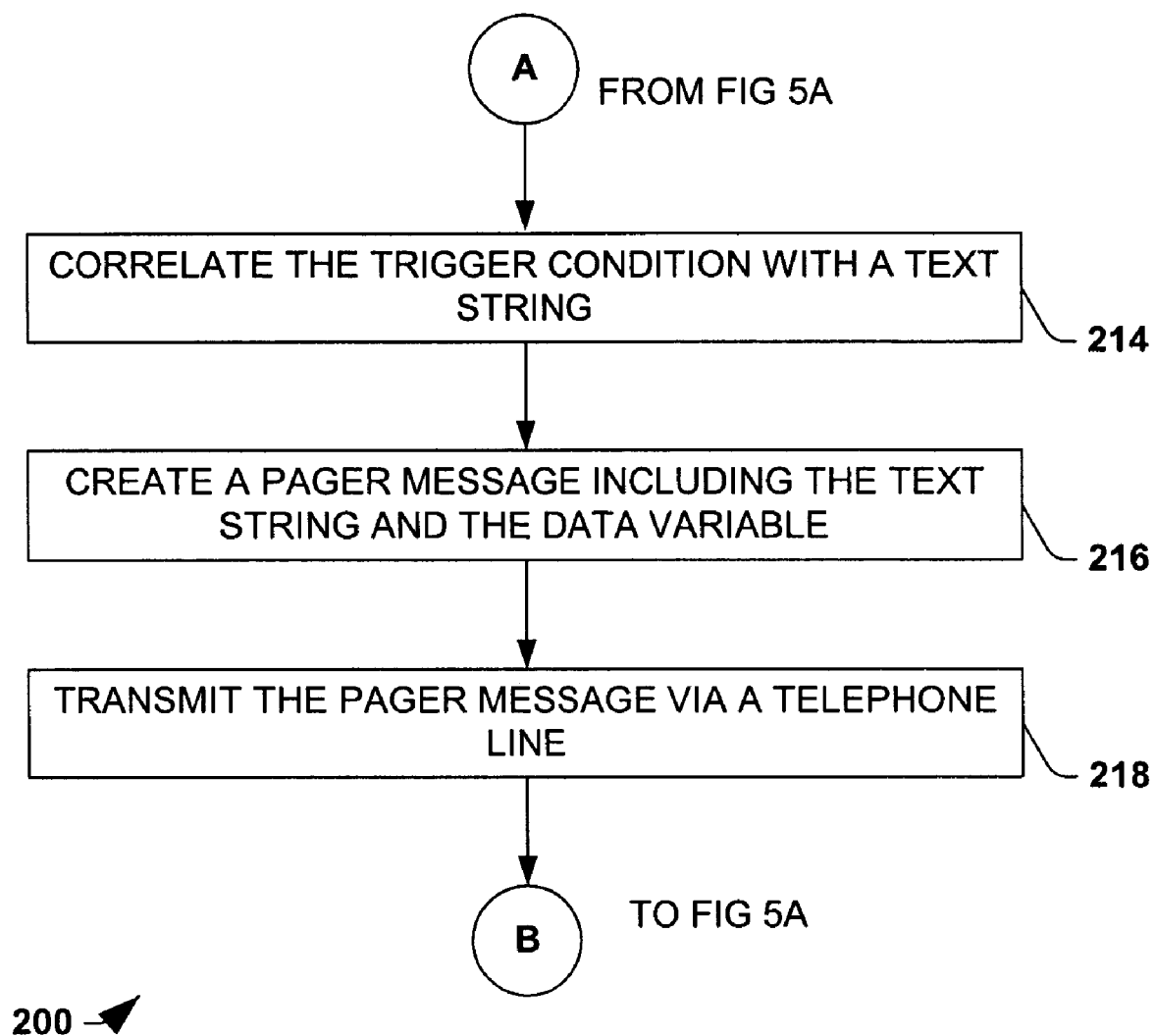
FIG. 5B is a flow diagram further illustrating the method of FIG. 5A.

Referring now to FIGS. 5A and 5B, an exemplary method 200 for sending a message from a control device to a remote device via a telephone line is illustrated in accordance with another aspect of the invention. The method may be implemented, for example, using the exemplary communications device 102 in the control system 100 of FIG. 3A. The method 200 begins at step 202, in which a trigger information request message (e.g., messages 150 and 170 of FIGS. 4A and 4C) is sent to the control device (e.g., PLC control device 108 of FIG. 3A), after which a trigger information response message (e.g., messages 160 and 175 of FIGS. 4B and 4D) is received at step 204 from the control device 108.

Thereafter, the communications device 102 determines whether a trigger condition exists at step 206. If not, the method continues again at step 202. In this regard, it will be appreciated that the trigger information request messages may be sent to the control device 108 periodically, and that the user configuration or programming of the communications device 102 may provide the period at which the messages are sent.

If a trigger condition is determined to exist at decision step 206, the trigger condition is correlated with a data variable at step 208, and a data read request message (e.g., message 180 of FIG. 4E) is sent to the control device 108 at step 210. Thereafter, a data read response message (e.g., message 185 of FIG. 4F) is received at step 212. Referring also to FIG. 5B, the trigger condition is then correlated with a text string (e.g., from list 136 of FIGS. 3A and 3B) at step 214.

The communications device 102 then constructs or creates a pager message (e.g., message 190 of FIG. 4G) including the text string and the data variable (e.g., value 187 obtained in the variable data response message 185 of FIG. 4F), which is then transmitted to a remote device via a telephone line (e.g. line 104 of FIG. 3A) at step 218. Thereafter, the method returns to step 202, whereat another trigger information request message may be sent to the control device 108 as described supra.

Referring now to FIGS. 6A–6D, another exemplary method 300 is illustrated for sending a message from a control device (e.g., device 108 of FIG. 3A) to a remote device (not shown) via a telephone line (e.g., line 104 of FIG. 3A) in accordance with another aspect of the invention. Although the methods 200 and 300 illustrated and described herein may be implemented in the communications apparatus 102 of FIG. 3A, it will be appreciated that the methods may be practiced in other systems and apparatus beyond those illustrated herein, and further that the apparatus and systems of the invention may operate according to methodologies other than the methods 200 and 300 illustrated herein.

Figure 6A:
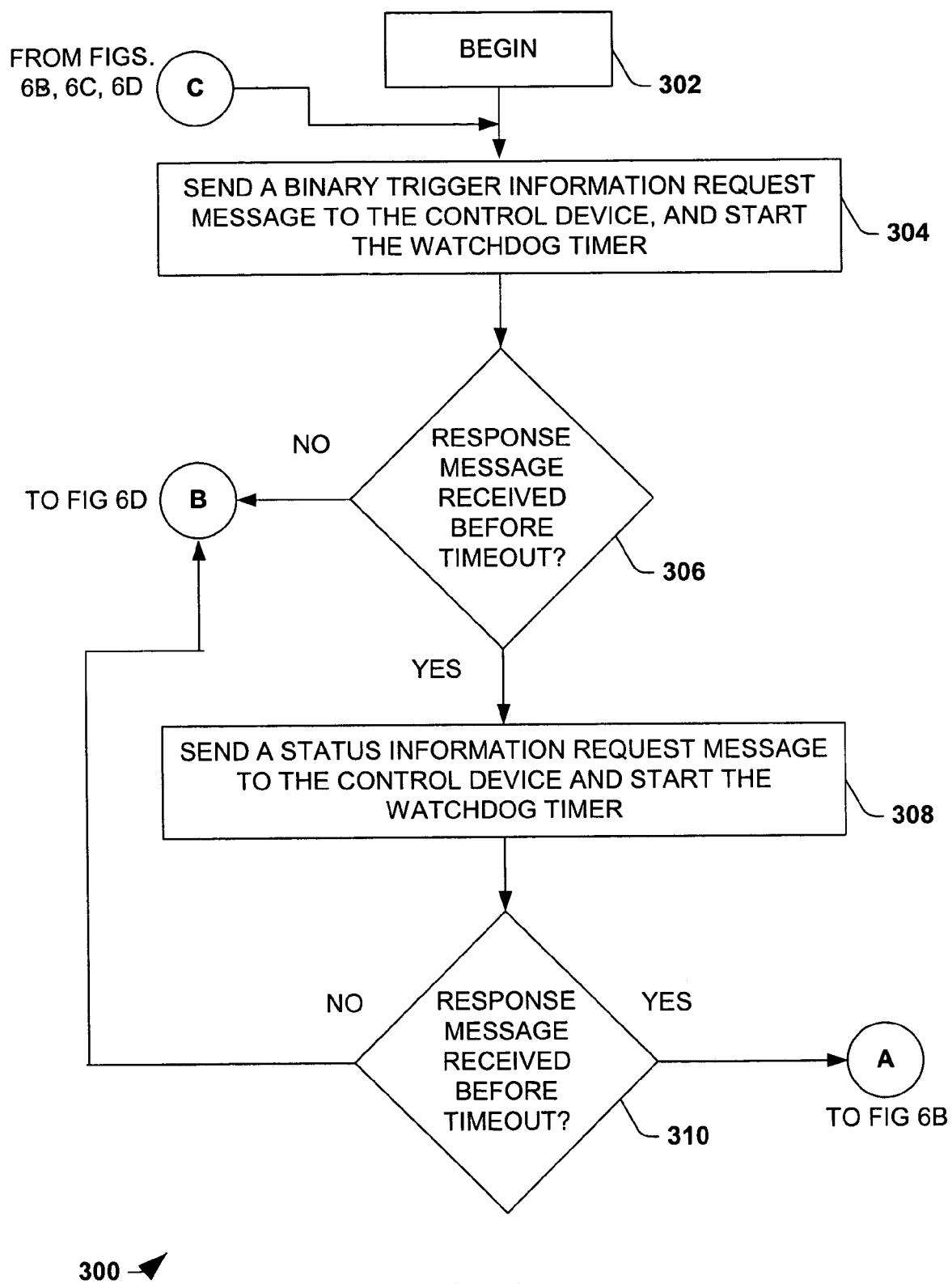
FIG. 6A is a flow diagram illustrating another exemplary method for sending a message from a control device to a remote device via a communications medium in accordance with another aspect of the invention.

The method 300 begins at step 302 of FIG. 6A, after which a binary trigger information request message (e.g., message 150) is sent to the control device (e.g., device 108) at step 304. An optional watchdog timer (not shown) may be activated in the communications apparatus (e.g., device 102) to provide for situations where a control device (e.g., device 108) does not respond to a request message from the communications apparatus or device 102. If such a watchdog timer is activated or enabled, its timer is started at step 304 to guard for a non-responsive control device. If the control device 108 does not provide a response message prior to the watchdog timer timing out, the method 300 proceeds from decision step 306 to FIG. 6D, as described in greater detail infra.

Figure 6B:
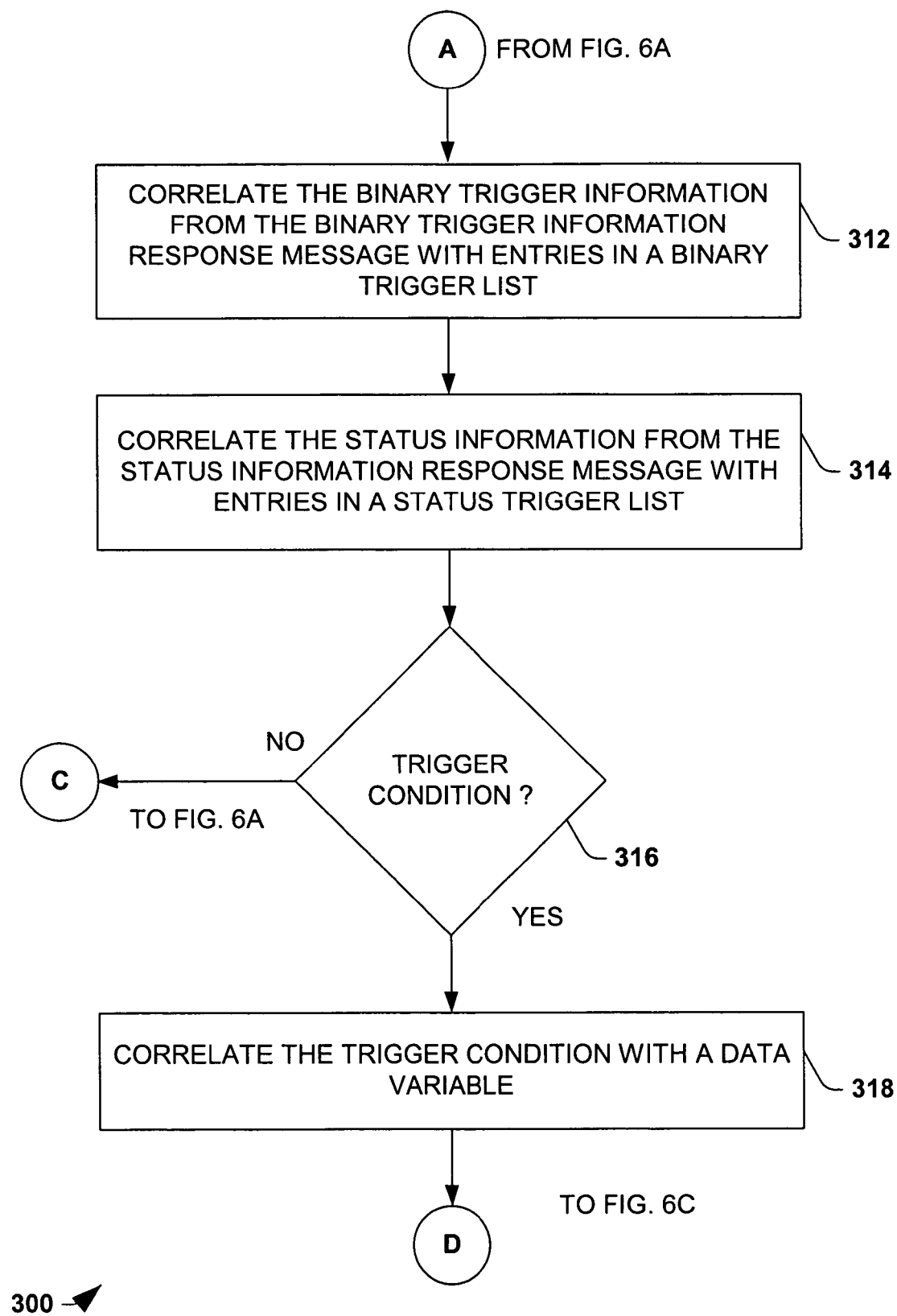
FIG. 6B is a flow diagram further illustrating the method of FIG. 6A.

If a binary trigger information response message (e.g., message 160) is timely received, a status information request message is sent to the control device at step 308, and a watchdog timer is started. If the control device does not respond within the watchdog timer period, the method proceeds from decision step 310 to FIG. 6D, as described in greater detail infra. Referring also to FIG. 6B, if a status information response message (e.g., message 175) is timely received at step 310, the binary trigger information from the binary information response message is correlated with one or more entries in a binary trigger list (e.g., list 134a of FIG. 3B) at step 312, and the status information from the status information response message is correlated with one or more entries in a status trigger list (e.g., list 134b) at step 314. Based on the correlations in steps 312 and 314, the communications device determines whether a trigger condition exists at decision step 316. If no trigger condition exists, the method returns to step 304 of FIG. 6A.

Figure 6C:
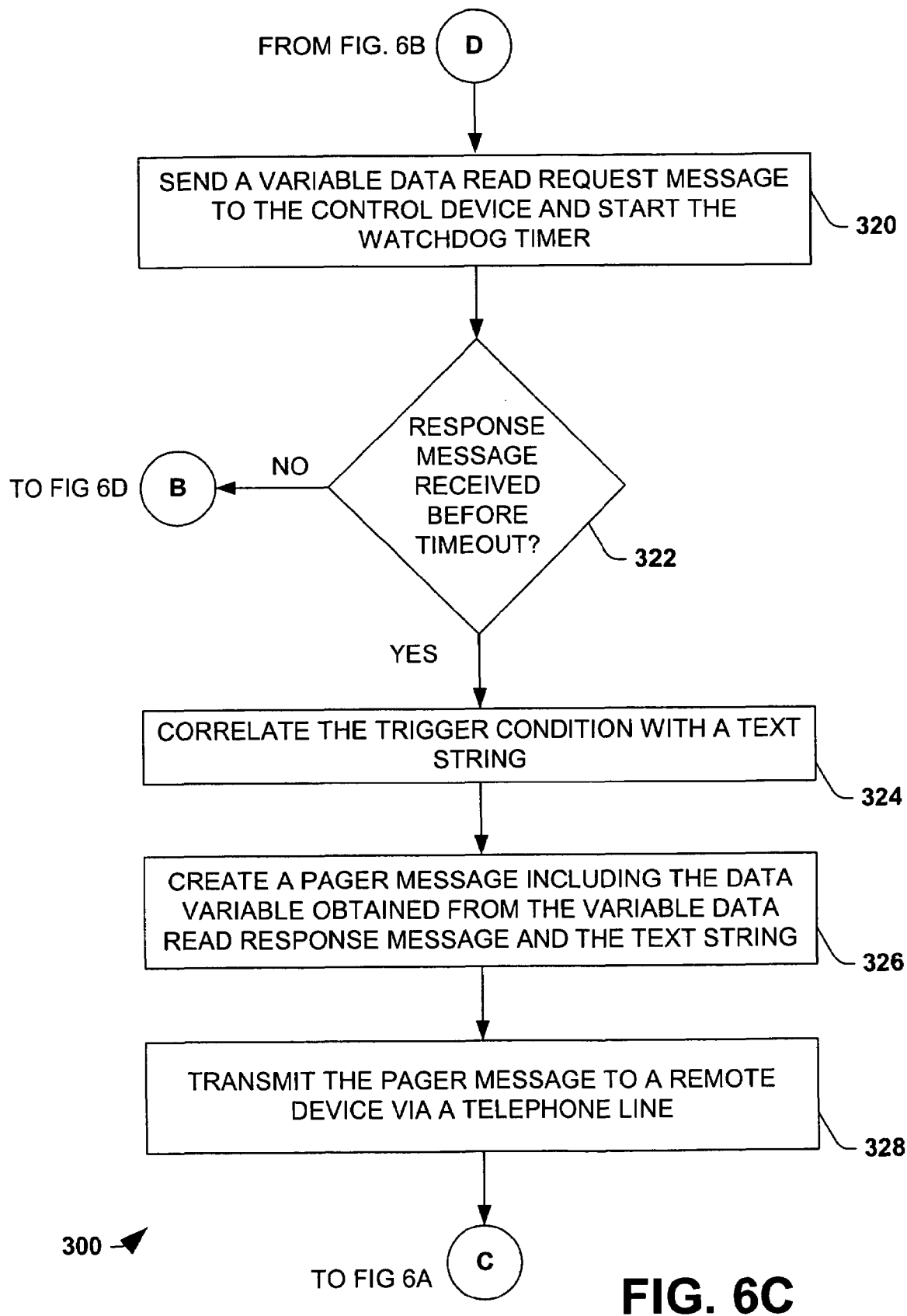
FIG. 6C is a flow diagram further illustrating the method of FIGS. 6A and 6B.

If a trigger condition exists, the trigger condition is correlated with a data variable (e.g., from list 138) at step 318. Referring also to FIG. 6C, a variable data read request message (e.g., message 180) is then sent to the control device at step 320, after which the communications device determines at step 322 whether a response message (e.g., message 185) has been received before a watchdog timer started in step 320. If so, the trigger condition is correlated with a text string (e.g., from list 136) at step 324. Thereafter, a pager message (e.g., message 190 of FIG. 4G) is created at step 326, which includes the data variable and the text string. The pager message is then sent or transmitted via a telephone line (e.g., line 104) to a remote device (not shown) at step 328.

Figure 6D:
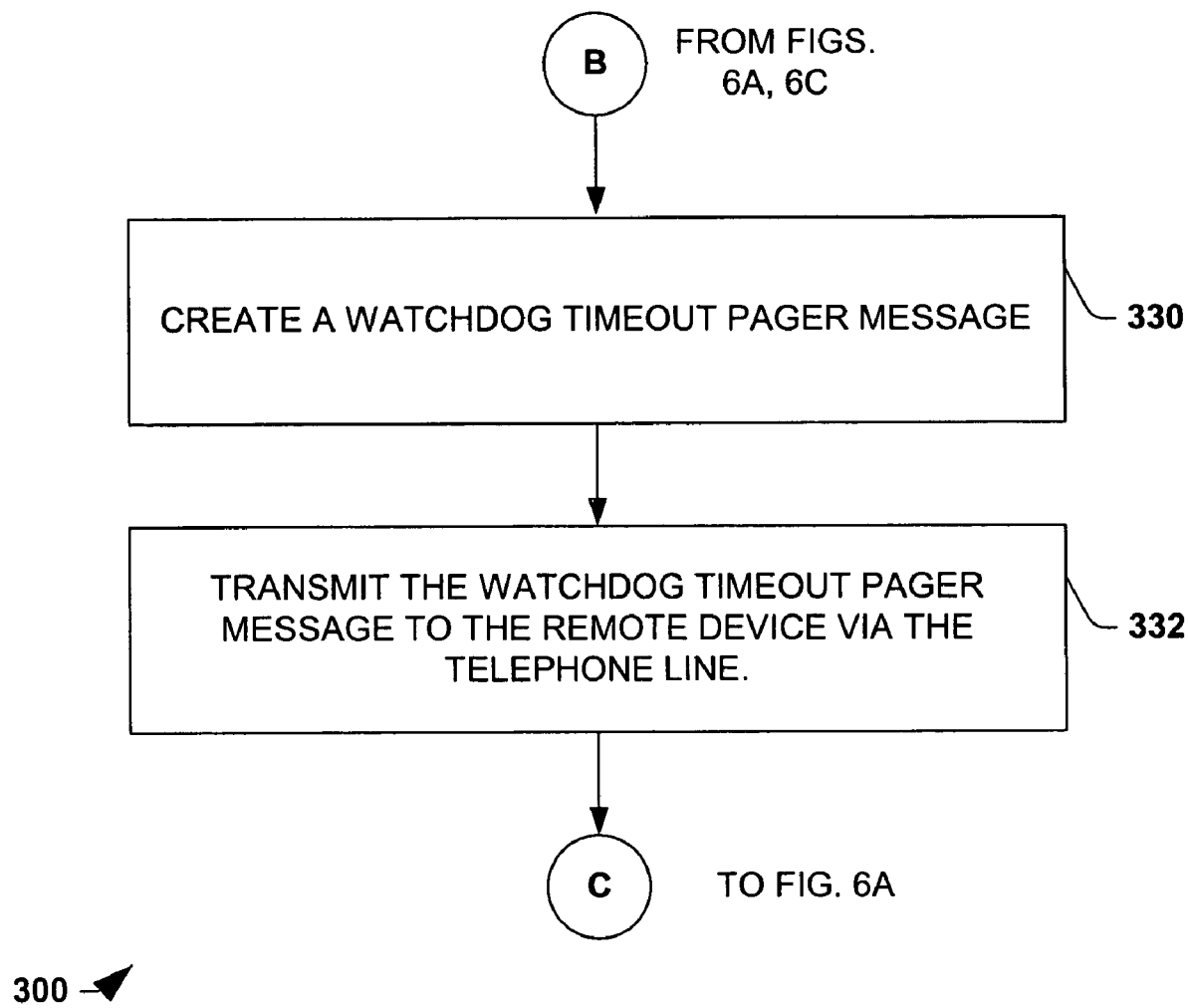
FIG. 6D is a flow diagram further illustrating the method of FIGS. 6A–6C.

Referring also to FIG. 6D, if the control device fails to respond to a request message at various steps in the method 200 (e.g., steps 306, 310, and 322) before timeout of the watchdog timer, the communications device may create a watchdog timeout pager message (not shown) at step 330, which is transmitted to a remote device via the telephone line at step 332. This enables a recipient of the timeout pager message to take some action corresponding to the loss of communications between the control device and the communications device.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the steps of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates communication between an industrial control device and a remote user device, comprising:
    an industrial control device that monitors information related to an industrial automation environment; and
    a processor that receives information from the industrial control device, determines whether a trigger condition exists, associates a data variable with the trigger condition, and selectively constructs and transmits a least one pager message to the remote user device if a trigger condition exists.

2. The system of claim 1, the processor receives programming information from the remote user device in response to the at least one pager message and constructs and transmits a programming message to the industrial control device.

3. The system of claim 1, the remote user device is at least one of a telephone, cellular telephone, a personal desktop assistant (PDA), a personal computer, a laptop computer, and a pager.

4. The system of claim 1, the at least one pager message comprises at least one text string.

5. The system of claim 1, the industrial control device is a programmable logic controller (PLC).

6. The system of claim 1, the processor and the remote user device communicate via at least one of a Telocator Alphanumeric Paging protocol and an ASCII protocol.

7. A method for communicating between an industrial control device and a remote user device, comprising:
    receiving information related to an industrial automation environment from the industrial control device;
    determining whether received information indicates a trigger condition;
    associating a data variable with an extant trigger condition;
    selectively constructing a pager message comprising a text string and the data variable; and
    transmitting the pager message to the remote user device.

8. The method of claim 7, further comprising permitting a user to transmit a programming message via the remote user device.

9. The method of claim 8, the programming message comprises information associated with resetting at least one value determinative of a trigger condition.

10. The method of claim 8, at least one of the pager message and the programming message is constructed and transmitted via at least one of a Telocator Alphanumeric Paging protocol and an ASCII protocol.

11. The method of claim 8, further comprising translating the programming message to a communications protocol that is readable by the industrial control device.

12. The method of claim 11, further comprising reprogramming the industrial control device according to the translated programming message.

13. The method of claim 8, further comprising permitting the user to selectively direct translation and transmission of the programming message to the industrial control device to effect reprogramming of the industrial control device via the remote control device.

14. A system that facilitates communication between an industrial control device and a remote user device and selective reprogramming of the industrial control device, comprising:
    means for detecting extant trigger conditions in an industrial automation environment;
    means for assigning a data variable to the trigger condition:
    means for translating information indicative of the extant trigger condition into at least one pager message; and
    means for transmitting the at least one pager message to a remote user device to alert a user to the extant trigger condition.

15. The system of claim 14, further comprising means for reprogramming the industrial control device via the remote user device.

16. The system of claim 15, the means for reprogramming the industrial control device comprising means for receiving, translating, and transmitting a programming message from the remote user device to the industrial control device.

17. The system of claim 14, the at least one pager message comprising at least one text string and a data variable associated with the extant trigger condition.

* * * * *